United States Patent [19]

Freund

[11] Patent Number: 5,762,027
[45] Date of Patent: Jun. 9, 1998

[54] APPARATUS FOR APPLYING POWDERS TO ANIMALS

[76] Inventor: Douglas A. Freund, 15729 Avondale Rd. NE., Woodinville, Wash. 98072

[21] Appl. No.: 532,216

[22] Filed: Jun. 12, 1995

Related U.S. Application Data

[63] Continuation-in-part of Ser. No. 716,369, Jun. 14, 1991, abandoned.

[51] Int. Cl.$^6$ .................................................. A01K 13/00
[52] U.S. Cl. ........................ 119/672; 119/497; 383/41
[58] Field of Search .......................... 119/672, 674, 119/675, 497; 190/111, 112, 119; 383/41

[56] References Cited

U.S. PATENT DOCUMENTS

| | | | |
|---|---|---|---|
| 3,850,144 | 11/1974 | Springer et al. | 119/497 |
| 4,811,768 | 3/1989 | Williams | 383/41 X |
| 4,872,538 | 10/1989 | Fournier | 190/112 X |

FOREIGN PATENT DOCUMENTS

| | | | |
|---|---|---|---|
| 2452764 | 5/1976 | Germany | 383/41 |

*Primary Examiner*—Robert P. Swiatek
*Attorney, Agent, or Firm*—Weiss Jensen Ellis & Howard

[57] ABSTRACT

An apparatus for the application of powder-type medication to small animals including cats, small dogs, rabbits, hamsters, guinea pigs, etc. The apparatus consists of at least one piece of material cut into a selected configuration, when constructed will secure the animal with at least the head exterior to the apparatus, and will allow placement of the animal in the apparatus and subsequent administration of the medication without the fear of the animal escaping.

4 Claims, 1 Drawing Sheet

APPARATUS FOR APPLYING POWDERS TO ANIMALS

This application is a continuation-in-part application of copending application Ser. No. 07/716,369, filed on Jun. 14, 1991, now abandoned.

FIELD OF THE INVENTION

This invention relates to an apparatus for administering dry, powder-type medications to small animals. This inventive apparatus allows for the application of dry, powder-type medications, such as flea powder, without the risk of injury to the animal or the person applying the powder. The invention also relates to an apparatus that can serve as pet carriers or mechanisms to safely restrain animals during transportation.

BACKGROUND OF THE INVENTION

The pet products industry is a billion dollar a year industry serving a wide variety of interests and needs of pet owners. With the size of the industry, solutions to a particular need are in high demand, thus providing an incentive to develop certain products. A persistent and universal concern of pet owners is the ability to safely apply dry, powder-type medications such as flea powders or other powders used to control skin conditions or general topical conditions. Unfortunately, a current commercial product is not available that ensures a safe, effective means for applying powder-type medications.

Presently, pet owners and handlers must wrestle with uncooperative animals while attempting to apply the medications, risking injury to themselves through potential scratches and bites, as well as potential exposure to the harmful effects from accidental inhalation of the powder or contact to the pet handler's skin, either condition specifically warned against on many animal medications.

In addition to the potential injury to the pet handler, there is the risk of harm to the animal itself. In attempting to apply powder-type medications, the pet handler will try to control an animal's movement to minimize the handler's exposure to the medications and the handler's potential of injury from the animal. Particularly with animals such as cats and other animals that do not necessarily follow orders, control of the animal can be very challenging with the animal struggling to escape the treatment. Depending on the extent of restraint used to control the animal, the animal has the risk of varying degrees of injury as does the pet handler.

Because of the general difficulty in applying powder-type medications to animals, medications are often applied in a less than satisfactory or complete manner. Consequently, the animal does not receive the full benefit of the medication, and, medications often need to be applied on a repeated and consistent basis. Such repeated treatments increases the risk of injury to the pet handler and also creates greater trepidation and potentially more violent reactions by the animal.

SUMMARY OF THE INVENTION

The current invention provides an effective and safe apparatus for the thorough application of powder-type medications to relatively small animals including cats, small dogs, rabbits, hamsters, guinea pigs, etc. The apparatus is made of a flexible, yet sturdy material to allow for ease of use and to facilitate application of powder-type medications. The apparatus can be constructed in various sizes and dimensions to facilitate ease of use with animals of different size. Therefore, it is the intent of the invention to provide an apparatus for thorough application of powder-type medications to smaller animals. It is a further intent of the invention to provide a safe mechanism for the application of these medications, thus preventing injury to the animal or the pet handler. It is a further intent of the invention to provide an apparatus that is adjustable to fit different sizes of animals through adjustable mechanisms on the apparatus. It is a further intent of the invention to provide for an easy mechanism for placing the animal in the apparatus before application of the medication. It is a further intent of the invention to have the apparatus also function as a pet carrier in association with the application of powder-type medications or separately from this function. It is a further intent of the invention to have the apparatus function as a method to restrain and secure an animal during transportation, such as in a car.

DRAWINGS

DETAILED DESCRIPTION OF THE INVENTION

The current invention is an apparatus useful in the application of powder-type medications, such as flea powders to small animals. The apparatus is made of a flexible, durable cloth such as terry, denim, or other strong natural or synthetic material sufficient to hold a small animal without the fear of the material readily tearing during use or of the animal's claws easily protruding out from the interior of the bag resulting in potential injury to the pet handler. It is preferred that the apparatus would be constructed of a material that is non-irritating to the animal and would facilitate dispersement of the medication over the animal's entire body. While the apparatus has the ability to be constructed in a variety of sizes and configurations or dimensions, a single unit of the apparatus has the ability to adjust to variable sizes of animals through the lack of need, or the undesireableness for a snug or even form configuring fit of the apparatus to the animal and of the ability to adjust the apparatus at the point of the animal's neck.

The apparatus is of simple construction to allow for easy use and to minimize cost of construction, making the apparatus affordable and simple to use. The apparatus consists of the main body of the apparatus (1) which may be made out of a single sheet of material or multiple sheets, and then assembled to make the apparatus. The main body of the apparatus may be any shape or configuration which would facilitate easy containment of the animal without discomfort to the animal and still provide sufficient room within the apparatus for administering the powder-type medication. In a different embodiment, the apparatus may have a disposable liner or internal piece of material that conforms to the internal structure of the apparatus, but which may, after using the apparatus for application of powder-type medication, removed and thrown away. Such disposable liner would allow use of one apparatus for several different types of medication or different animals without fear of cross-contamination.

Figure 1:
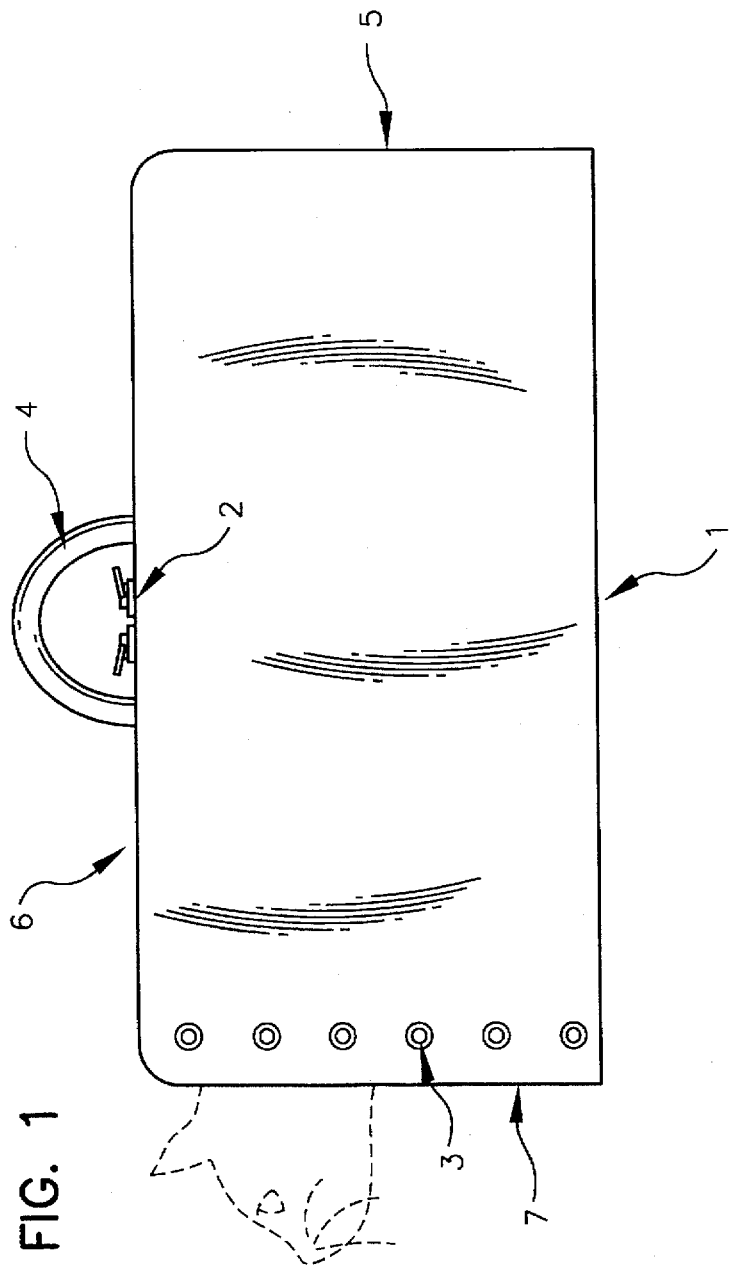
FIG. 1 is a side elevational view of the apparatus showing the perspective of the animal in the apparatus.
Figure 2:
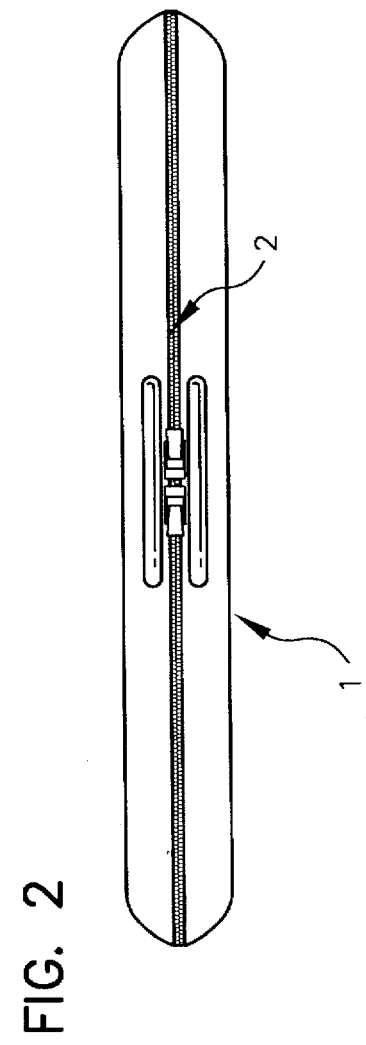
FIG. 2 is a top view of the apparatus showing the longitudinal fastening device on the apparatus.

The preferred embodiment has a generally rectangular shape from the side elevational view (FIG. 1) for purposes of ease in construction to minimize cost and the preferred configuration for purposes of ease of applying the powder-type medication to the animal. The apparatus is substantially flat when not containing an animal. The apparatus has one or more fastening devices (2) substantially along longitudinal extent (6) of the apparatus, and, also optionally down at least one latitudinal extent of the apparatus, on the latitudinal extent opposite the adjustable fasteners (3) to provide additional ease in placing the animal in the apparatus. An illustrative fastening device (2) depicted in FIGS. 1 and 2 is a zipper-type fastening apparatus, but it is understood that the apparatus may utilize other means of fastening, such as velcro, to provide the same function of secure fastening after placing the animal in the apparatus, with the ability to partially re-open the fastening device to allow for administering the powder-type medication without the animal escaping. FIGS. 1 and 2 show the fastening device (2) as a two-way zipper, to allow for partial opening at the midpoint on the animal. It is understood that any other fastening device that would allow for such function could be used instead of the two-way zipper. The adjustable fasteners (3) along at least one latitudinal extent of the apparatus are shown in FIG. 1 as snaps, such that those snaps located below the animal's neck are snapped closed and those snaps above the animal's neck are snapped closed, allowing for a comfortable, yet secure, fit around the animal's neck. It is understood that any other adjustable type of fastener may be used in the place of the snaps shown in FIG. 1, so long as the fastening device provides the necessary functions of comfort and containment. These adjustable fasteners (3) are substantially the entire length of at least one latitudinal extent of the apparatus as represent by edge (7) to allow for variable adjustments. Preferably, the fasteners are spaced sufficiently close together that the animal cannot exert sufficient force to open the bag.

The apparatus can also contain handles or straps (4) which make for ease of carrying the apparatus with or without the animal in the apparatus, and for use in securing the apparatus during transportation by placing the seatbelt of a car or truck through the handles of the apparatus. Preferably the handle position is offset on the longitudinal extent so that it is positioned above the center of gravity of an animal retained within the bag. The offset will of course depend upon the weight and size of the animal and in different embodiments the handle may be affixed in different positions. In an alternative embodiment, the handle may be movably mounted on the longitudinal aspect of the bag. Edge (5) may be a further extension of fastening device (2), or may be a seamed edge.

To use the apparatus, the fastening device (2), substantially along the longitudinal extent of the apparatus, is opened, as well as the adjustable fasteners (3) along at least one latitudinal extent. The apparatus is then laid on the floor, with the apparatus spread open to allow for placement of the animal on the interior of the apparatus. The adjustable fasteners are secured snugly, but not restrictively, around the neck of the animal and the other fastening device is closed. The order of fastening between the adjustable fasteners (3) and the fastening device (2) depends on the choice of the pet handler. The animal's entire body, except for the head, is now within the interior of the apparatus, ready for application of any powder-type medication. Also, the animal's claws are also now safely within the confines of the apparatus and away from the handler. With the animal's body within the apparatus, the animal has lost most of its coordination and has lost the ability to walk or escape. With this loss of ability of coordinated movement, the animal will also have more difficulty attempting to bite the pet handler.

With the animal safely within the apparatus, the pet handler may now partially unzip or undo the closing device around the main body of the animal, leaving the snaps or other closing devices around the neck area firmly in place. The apparatus is opened just enough to allow the pet handler to administer a desired amount of medication within the interior of the apparatus, without the animal escaping or attempting to escape. The apparatus is then re-closed to prevent the medication from leaving the apparatus during the next steps of dispersion of the medication over the entire animal. Now, the pet handler may begin to rub and move the apparatus about the animal in a manner that facilitates dispersion of the medication over the entire body of the animal within the apparatus. The movement of the apparatus and the animal within the apparatus will create a cloud-like effect of the powder-type medication to assist in working the medication into the animals fur, through random dispersion, with no damage to the animal or the pet handler. With the use of the apparatus, even parts of the animal normally difficult to cover, such as legs and paws, are easily medicated.

While the animal is still confined in the apparatus, medication may be applied to the animal's head and neck. Additionally, the pet handler may administer other medications such as eye and ear drops, oral medications, and the like, without danger of injury from scratching or the animal escaping. Obviously, the pet handler still has some risk of being bitten during administration of the medication to the animal's head, but the overall fear and likelihood of being scratched, clawed or bitten during the process of applying medication to the entire animal is significantly reduced for the pet handler. In addition, the risk of injury to the animal is reduced through this relative immobilization. The pet handler is also aided through the prevention of the animal escaping during the medication process, reducing the time and burden normally associated with the process. This is also helpful if the medication requires any timed exposure for benefit of treatment.

While the animal is relatively immobilized within the apparatus, the pet handler may also administer injectable medications through partially opening the apparatus to allow access to the desired area on the animal. After medication of the animal, the apparatus is merely unzipped or opened to allow the animal to escape or be removed by the pet handler.

The apparatus also minimizes the potential exposure, for the pet handler and the animal, to the harmful effects of inhalation of the medication, or the topical exposure of the medication for the pet handler. Many powder-type veterinary medications, such as flea powder, carry a warning regarding the dangers of inhalation or topical exposure for the pet handler. As a result, the pet handler must take numerous precautions through masks and gloves to prevent exposure to the medication. Even with these steps, prevention of exposure is not ensured, with most pet handlers not taking the time or desiring the additional expense or inconvenience of acquiring and using these exposure-prevention devices. The current inventive apparatus eliminates the need to use these exposure-prevention steps or devices since the medication is confined to the interior of the inventive apparatus, including any excess medication remaining after treatment of the animal. This confinement of the medication also provides an additional benefit by minimizing any clean-up after medication. Without the use of the apparatus, the powder is scattered around the area of application and is also air-borne, increasing the risk of harmful exposure. The apparatus is closed again and stored for the next application.

While particular applications of the present invention have been described in this application, it is understood and apparent that changes and modifications may be made therein without departing for the invention. All such changes and modifications fall within the spirit and scope of the invention and the claims herein.

I claim:

1. A flexible apparatus for administration of powder-type medication to animals comprising:

at least one piece of material cut to a selected configuration with a fastening device substantially along a longitudinal extent of the apparatus, which fastening device allows for the placement in and removal from the apparatus of the animal and the partial opening of the fastening device to allow for the administration of the powder-type medication, and a series of adjustable fastening devices partially along at least one latitudinal extent of the apparatus to allow for adjustment of the adjustable fastening devices around the animal's neck to secure the animal in the apparatus.

2. An apparatus of claim 1, further comprising:

at least one handle to allow for ease in carrying the apparatus with or without the animal contained in the apparatus.

3. A flexible apparatus for administering a powder-type medication to an animal comprising:

a means for retaining an animal comprising at least one piece of a material cut to a selected configuration and having a reversible fastening device permanently affixed substantially along a longitudinal extent of the apparatus, said reversible fastening advice providing for the placement in, and removal from, the apparatus of the animal, said retaining means further comprising a partial opening in the longitudinal reversible fastening device for administering the powder-type medication therethrough and said retaining means still further comprising a means for a reversible closure partially along at least one latitudinal extent of the apparatus, said retaining means comprising a series of adjustable fastening devices effective to retain the animal's body within the apparatus and with the animal's head exterior to the apparatus.

4. The flexible apparatus of claim 3 wherein said reversible closure along at least one latitudinal extent comprises a plurality of snap fasteners sufficient to retain the animal without harming or releasing the animal.

* * * * *